(12) United States Patent
Keiter et al.

(10) Patent No.: US 12,061,700 B2
(45) Date of Patent: Aug. 13, 2024

(54) LOGOS AS VISUAL INDICATORS OF TRUST IN APPLICATIONS

(71) Applicant: Bank of America Corporation, Charlotte, NC (US)

(72) Inventors: Kelly Keiter, Waxhaw, NC (US); Cody Searl, Indian Land, SC (US); Michael Young, Davidson, NC (US); Melissa Gordon Glenn, Charlotte, NC (US); Sanjay Lohar, Charlotte, NC (US)

(73) Assignee: Bank of America Corporation, Charlotte, NC (US)

( * ) Notice: Subject to any disclaimer, the term of this patent is extended or adjusted under 35 U.S.C. 154(b) by 209 days.

(21) Appl. No.: 17/885,711

(22) Filed: Aug. 11, 2022

(65) Prior Publication Data

US 2024/0054219 A1 Feb. 15, 2024

(51) Int. Cl.
*G06F 21/64* (2013.01)
*G06F 21/57* (2013.01)

(52) U.S. Cl.
CPC ............ *G06F 21/57* (2013.01); *G06F 21/645* (2013.01); *G06F 2221/033* (2013.01)

(58) Field of Classification Search
CPC .. G06F 21/57; G06F 21/645; G06F 2221/033; G06F 21/64
See application file for complete search history.

(56) References Cited

U.S. PATENT DOCUMENTS

| | | | |
|---|---|---|---|
| 9,942,257 B1 * | 4/2018 | Hitchcock | H04L 63/1433 |
| 2008/0189770 A1 * | 8/2008 | Sachtjen | H04L 9/12 726/4 |
| 2009/0106557 A1 * | 4/2009 | Leonard | H04L 63/12 713/176 |
| 2016/0261609 A1 * | 9/2016 | Derman | H04L 63/126 |
| 2017/0228229 A1 * | 8/2017 | Jain | G16H 40/63 |
| 2018/0136612 A1 * | 5/2018 | Zayets-Volshin | G06Q 50/01 |
| 2022/0342958 A1 * | 10/2022 | Lillard | G06F 16/51 |

FOREIGN PATENT DOCUMENTS

CN 114201735 A * 3/2022

* cited by examiner

*Primary Examiner* — Joseph P Hirl
*Assistant Examiner* — Aayush Aryal
(74) *Attorney, Agent, or Firm* — Weiss & Arons LLP

(57) ABSTRACT

Apparatus and methods for providing an indicator of trustworthiness of a software application are provided. A program may receive information regarding the software application from a developer of the application. The program may analyze the application and determine that the application is trustworthy and secure. The program may then create a unique logo that may include various information to indicate to a user that the program has determined the application is trustworthy. The program may transmit the logo to the developer so the developer may incorporate the logo into the application. In an embodiment, the program may transmit the logo to a third-party application store for display on a page where the application is available.

18 Claims, 6 Drawing Sheets

LOGOS AS VISUAL INDICATORS OF TRUST IN APPLICATIONS

FIELD OF TECHNOLOGY

Aspects of the disclosure relate to providing apparatus and methods for issuing visual logos and other indicators of trust in software applications.

BACKGROUND OF THE DISCLOSURE

Many available software applications reference or use other software applications or refer to third-party entities that have no control over the software application.

For example, there are numerous financial literacy and budgeting applications available to consumers. Many of these financial applications aggregate data from the consumer's financial accounts (checking accounts, saving accounts, etc.). The financial applications may link to the accounts or even display a logo belonging to the entity controlling the account(s).

However, the entities controlling those accounts, such as a bank or other financial institution, have no control over these financial applications and may be unable to block access if the consumer hands over account login information to the application. When seamless account access occurs, or a logo is displayed without permission, consumers may become confused and believe that the financial institution views the application as trustworthy. The application(s) may or may not be trustworthy.

Further, the financial institutions may or may not agree with the application's legal/illegal, political, social, ethical, or moral positions and may or may not desire to be associated with a particular application. For example, an application or its developers may endorse a particular political viewpoint that is controversial. The financial institution may or may not desire to be associated with that particular political viewpoint.

Therefore, it would be desirable for apparatus and methods for creating and issuing visual and other indicators of trust in software applications. The indicator(s) may inform a user that the entity issuing the indicator trusts the security and other parameters of the software application.

SUMMARY OF THE DISCLOSURE

It is an object of this disclosure to provide apparatus and methods for creating and issuing visual logos and other indicators of trust in software applications.

A logo visual trust computer program product is provided. The computer program product may include executable instructions. The executable instructions may be stored in a non-transitory memory and may be executed by a processor on a computer system.

The program may create a logo that indicates to a viewer that a software application is trustworthy. Multiple variations of indicating trustworthiness may be used, including multi-colored checkmarks.

The program may receive one or more quanta of information about the software application from a developer of the software application. The information may be transmitted by the developer or freely available to all. For example, the developer may have a website with various information about a particular application available for review.

The program may determine that the software application is or is not trustworthy. Trustworthy may include compatible security protocols, as well as compatible political, social, ethical, or moral positions held by the developer.

The program may transmit the logo to the developer when it has determined that the program is trustworthy or worthy of the logo. The program may log the transmission in a database. This log may include further information such as the application reviewed, details about the determination, how long the logo is good for, as well as other information.

The logo created by the program may include one or more of the following components or qualities, as well as other components or qualities. These components or qualities may be machine readable and/or visible to a human eye. These components or qualities may appear in metadata, or a manifest attached to a picture (e.g., a .jpeg file) of the logo.

The logo may include a visual indicator of trustworthiness, such as checkmark. In an embodiment, the checkmark may be color-coded.

The logo may include a name of an authorized recipient, such as the developer. Including the name of the developer the logo was transmitted to may increase the security of the logo, as a different developer may be unable to modify the logo to include its name. The logo may include the name of the name of the software application. The logo may include an identity of an entity creating the logo. This may indicate that the particular entity is the one that has determined that the application is trustworthy or aligns with the entity's values. The logo may include an expiration date. The logo may include metadata. The logo may include any of these components or qualities (as well as other components or qualities) alone or in any combination with each other.

In an embodiment, when the software application is available from a third-party application store, the program may transmit the logo to the application store in addition to the developer.

In an embodiment, when the program transmits the logo to the third-party application store, the owner (or developer) of the store may display the logo. The logo may be displayed within a page where a customer or user may download the application.

In an embodiment, the expiration date may include a countdown timer.

In an embodiment, when the countdown timer reaches zero, the logo may appear on a splash screen belonging to the software application together with a notification that the logo has expired.

In an embodiment, the logo may include a selectable hyperlink that may point a user to a website or webpage (or other location) that includes the components or qualities (i.e., the information) included with the logo. This may create a more compact and efficient logo, as well as enhancing security.

In an embodiment, the logo may be encrypted. In an embodiment, the information included within the logo may be encrypted.

In an embodiment, the program may determine the software application is trustworthy, and/or create the logo, through one or more artificial intelligence/machine learning ("AI/ML") algorithms.

In an embodiment, the entity may modify an already existing logo belonging to the entity to create the logo. For example, the entity may add a color-coded checkmark to its existing logo (along with other information) to create the logo.

In an embodiment, the database where the information behind the logo is stored may be a distributed ledger. The distributed ledger may be a blockchain.

In an embodiment, the logo (or the information included within) may be a non-fungible token ("NFT") that may be secured by a distributed ledger.

In an embodiment, the logo may appear on a splash screen belonging to the software application.

In an embodiment, the logo may include an audiovisual indicator of trustworthiness. The audiovisual indicator may also indicate when the logo has expired or is about to expire.

In an embodiment, the logo may include a tactile indicator of trustworthiness. The tactile indicator may be a vibration. The tactile indicator may also indicate when the logo has expired, or is about to expire In an embodiment, the logo may automatically change at one or more pre-determined time intervals. For example, if the logo is valid for one year, from months one through nine, the logo may include a green checkmark. From months nine through twelve the checkmark may change to yellow or orange. And from month twelve onwards (until a new logo is provided), the checkmark may change to red.

BRIEF DESCRIPTION OF THE DRAWINGS

The objects and advantages of the disclosure will be apparent upon consideration of the following detailed description, taken in conjunction with the accompanying drawings, in which like reference characters refer to like parts throughout, and in which.

DETAILED DESCRIPTION OF THE DISCLOSURE

Figure 1:
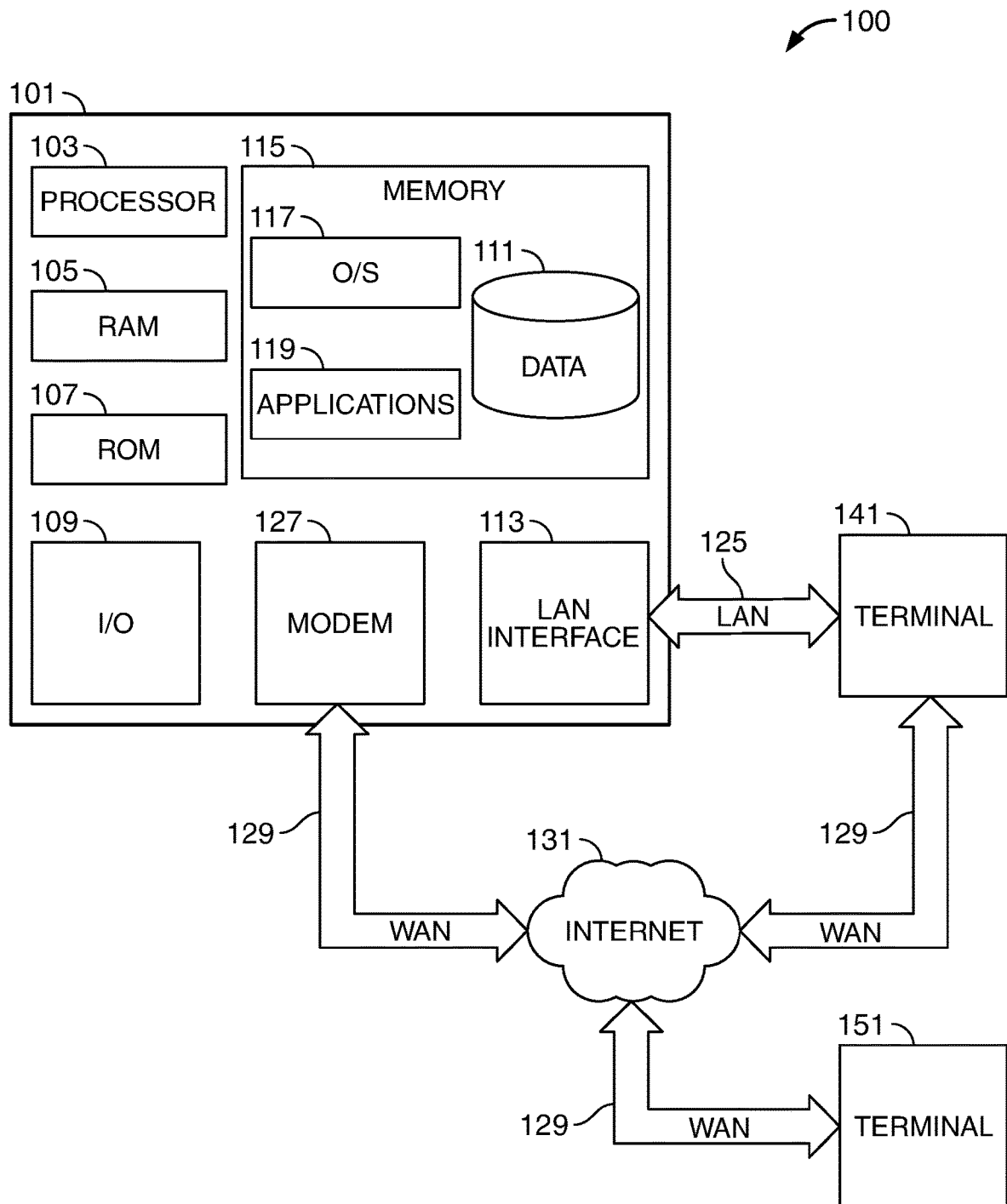
FIG. 1 shows an illustrative apparatus in accordance with principles of the disclosure.

It is an object of this disclosure to provide apparatus and methods for determining whether a software application, video, website, podcast, or other digital software-based item is trustworthy and creating and issuing visual and other indicators of trust in software applications, videos, websites, podcasts, or other digital software-based items.

A logo visual trust computer program product is provided. The computer program product may include executable instructions. The executable instructions may be stored in non-transitory memory and may be executed by a processor on a computer system. Multiple processors may increase the speed and capability of the program. The executable instructions may be stored in non-transitory memory on the computer system or a remote computer system, such as a server. Other standard components of a computer system may be present. The computer system may be a server, mobile device, or other type of computer system. A server or more powerful computer may increase the speed at which the computer program may run. Portable computing devices, such as a smartphone, may increase the portability and usability of the computer program, but may not be as secure or as powerful as a server or desktop computer.

The term "non-transitory memory," as used in this disclosure, is a limitation of the medium itself, i.e., it is a tangible medium and not a signal, as opposed to a limitation on data storage types (e.g., RAM vs. ROM). "Non-transitory memory" may include both RAM and ROM, as well as other types of memory.

The computer system may be a server. The computer program may be run on a smart mobile device. The computer program, or portions of the computer program may be linked to other computers or servers running the computer program. The server or servers may be centralized or distributed. Centralized servers may be more powerful and secure than distributed servers but may also be more expensive.

The program may receive one or more quanta of information about the software application, video, website, podcast, or other digital software-based item from a developer of the software application, video, website, podcast, or other digital software-based item. The information may include security parameters, development parameters, source code, executable code, encryption algorithms, information about the developer (company, owners, purpose, financial statements, etc.), as well as other information. The information may be transmitted by the developer directly to the program or the administrator of the program, or freely available to all. For example, the developer may have a website with various information about a particular application available for review.

In an embodiment, the program may request the developer provide information, or provide additional information to complete the program's analysis. In an embodiment, the program may utilize one or more artificial intelligence/machine learning algorithms to determine what information to request from the developer.

The program may determine that the software application is or is not trustworthy. The analysis may be performed through one or more artificial intelligence/machine learning algorithms or other algorithms.

In an embodiment, the program may subject the software application, video, website, podcast, or other digital software-based item to simulated malicious attacks to determine whether the software application, video, website, podcast, or other digital software-based item can defeat malicious activity.

A determination of trustworthy may include compatible security protocols, as well as compatible political, social, ethical, or moral positions held by the developer, and other indications of trustworthiness.

The program may create a logo that indicates to a viewer that a software application, video, website, podcast, or other digital software-based item is trustworthy. Multiple variations of indicating trustworthiness may be used, including sounds, vibrations, checkmarks, multi-colored checkmarks, a QR code, and other symbols (e.g., an X for an expired logo).

The logo may be encrypted. The logo may be interactive. The logo may be a picture file such as a .jpeg or .bmp. The logo may be a video file. The logo may be a combination of file types. The logo may be a .gif file with multiple frames.

As explained in this disclosure, the logo may include information. The information may be embedded. The information may be machine-readable. The information may be visible. The information may be hidden. The information may be encrypted.

The program may transmit the logo to the developer when it has determined that the software application, video, website, podcast, or other digital software-based item is trustworthy or worthy of the logo. The transmission may be encrypted. The transmission may be over the Internet, through a cellular connection, bluetooth, wi-fi, a local area network, or any other suitable communication protocol.

The program may log the transmission in a database. This log may include further information such as the application reviewed, details about the determination, how long the logo is good for, as well as other information. The log may be used to control the logo and keep track of its use to ensure that only authorized uses/users have access to the logo.

In an embodiment, the log may be automatically audited at various intervals. Auditing may involve checking that any logo created by the program is still valid and is only available to authorized users, among other information. The various intervals may be as short as every second or as long as once a year. The intervals may be adjusted based on the needs of the program (or the entity controlling the program).

The logo created by the program may include one or more of the following pieces of information (as components or qualities), as well as other information: a visual indicator of trustworthiness; a name of an authorized recipient of the logo; a name of the software application, website, podcast, etc.; an identity of the entity creating the logo (i.e., controlling the program); an expiration date; metadata; and a combination of the above. Other information may be included as well.

The information may be machine readable and/or visible to a human eye. The information may appear in metadata. The information may be embedded in the logo. The information may be embedded in a manifest attached to a picture (e.g., a .jpeg file) of the logo.

The logo may include a visual indicator of trustworthiness, such as checkmark, X, thumbs up, thumbs down, a color shade, different levels of transparency, or other visual indicator. In an embodiment, the checkmark may be color-coded.

For example, when the logo may be valid for 12 months, the logo may be an animated image file, such as a .gif. The first frame may include the logo and a green check mark. This frame may appear for the first nine months to indicate to a user that the logo is valid. The second frame may include the logo and a yellow check mark. This frame may appear for months nine through eleven to indicate to a user that the logo will expire in the next few months. The third frame may include the logo and a red check mark, or a red X. This frame may appear for the final month, to indicate to a user that the logo is expiring. The fourth frame may include a red X. The fourth frame may also be transparent, so that the logo is no longer visible to a human eye. This frame may appear after the logo has expired, to indicate to a user that the logo has expired (or if it is transparent, it will not be visible to the user at all, showing no signs of trustworthiness in the application, website, video, etc.).

The logo may include a name of an authorized recipient, such as the developer, author, or creator. The name may be the name of a person or entity. Including the name of the developer the logo was transmitted to may increase the security of the logo, as a different developer may be unable to modify the logo to include its name.

The logo may include the name of the software application, video, website, podcast, or other digital software-based item. Including the name of the software application, video, website, podcast, or other digital software-based item may allow a user to easily and quickly check whether the logo is applicable to the software application, video, website, podcast, or other digital software-based item the user is using at the time the logo appears.

The logo may include an identity of an entity creating the logo. This may indicate that the particular entity is the one that has determined that the software application, video, website, podcast, or other digital software-based item is trustworthy or aligns with the entity's values.

In an embodiment, a particular software application, video, website, podcast, or other digital software-based item may include multiple logos, each from a different entity. For example, a budgeting application may include logos from multiple financial institutions that separately determine that the application may be trustworthy.

In an embodiment, a central authority may create a logo for multiple entities to apply a single logo to a software application, video, website, podcast, or other digital software-based item. Each entity that desires to be a part of the central authority may determine what factors it requires for trustworthiness and transmit those factors to the central authority. The central authority may then determine which software application, video, website, podcast, or other digital software-based item meets those requirements for each entity.

The logo may include an expiration date. The date may indicate when the program determines the software application, video, website, podcast, or other digital software-based item is no longer trustworthy. The expiration date, while it is in a decipherable format, may indicate to a user that the logo is relevant, old, stale, expired, due to expire, or new.

In an embodiment, the logo may never expire. In an embodiment, the expiration date may be modified or modifiable.

The logo may include metadata. The metadata may include the same or different information as described above. The metadata may be machine readable. The metadata may be visible to the human eye. The metadata may be embedded within the visual confines of the logo. The metadata may be embedded within a hidden file outside the visual confines of the logo.

The logo may include an indicator of a level of trustworthiness in the software application, video, website, podcast, or other digital software-based item. For example, the logo may indicate that the software application, video, website, podcast, or other digital software-based item is trustworthy to the highest level (or a lower level) for security purposes, but not trustworthy for sociopolitical purposes, or any other combination or level of trustworthiness.

The logo may include any of this information (as well as other components or qualities) alone or in any combination with each other.

In an embodiment, when the software application, video, website, podcast, or other digital software-based item is available from a third-party application store, the program may transmit the logo to the application store separate from or in addition to the developer. Including a third party, such as an application store, within this process may increase security as well as hamper malicious activity from the developer or elsewhere.

In an embodiment, the program may require both the third-party application store and the software application, video, website, podcast, or other digital software-based item to display the logo. This may allow a user to double-check whether the logo is valid or not.

In an embodiment, when the program transmits the logo to the third-party application store, the owner (or developer)

of the store may display the logo. The logo may be displayed within a page where a customer or user may download the application. For example, in many third-party application stores, each application available for download may appear on its own page within the store. However, many podcasts or videos do not have a separate page or are bundled together with other podcasts or videos. In this example, each trustworthy podcast or video may have its own logo that may be displayed near the podcast or video within the store, and a single page may have multiple logos.

In an embodiment, the expiration date may include a countdown timer. The countdown timer may be a part of a larger software program or it may be a software program of its own. The countdown timer or time may be visible to a user. The countdown timer or time may be used by the program or logo to determine which frame (of a multi-frame logo) to display at a particular time. Using a countdown timer may decrease the memory size of the logo.

In an embodiment, when the countdown timer reaches zero, the logo may appear on a splash screen belonging to the software application together with a notification that the logo has expired. In another embodiment, the logo may turn transparent when the countdown timer reaches zero, so that the logo may no longer be visible to a user.

In an embodiment, the countdown timer may communicate with an outside source to determine an accurate date or time. For example, the timer may communicate with a trusted website to determine the date or time. The communication may be over any suitable communication network available to the logo. The outside date or time may be compared with the timer's internal date or time and any discrepancies may be corrected.

In an embodiment, the timer may check with an external source at a predetermined interval (e.g., every day, every week, once a month, etc.). In an embodiment, the timer may check with an external source when it determines, through its internal timer, that a deadline is approaching. For example, if the logo is valid for twelve months and is set to change appearance at the 9-month mark, the timer may confirm its accuracy as the 9-month deadline is approaching.

In an embodiment, the logo may include a selectable hyperlink or button that may point a user to a website or webpage (or other location) that includes the information included with the logo. This may create a more compact and efficient logo, as well as enhancing security. Including the information within a website in addition to (or instead of) within the logo itself may allow a user to confirm the logo's authenticity and other information. A website may be more secure than a logo transmitted to an application store or developer.

In an embodiment, the logo may be encrypted. In an embodiment, the information included within the logo may be encrypted. Any suitable encryption method or algorithm may be used. Encrypting the logo may prevent or deter a malicious actor from copying the logo for display on a non-trustworthy software application, video, website, podcast, or other digital software-based item.

In an embodiment, the program may determine the software application is trustworthy, and/or create the logo, through one or more artificial intelligence/machine learning ("AI/ML") algorithms. Any suitable AI/ML algorithm may be used, and multiple algorithms may be appropriate for analyzing more complex software applications, videos, websites, podcasts, or other digital software-based items.

In an embodiment, the entity may modify an already existing logo belonging to the entity to create the logo. For example, the entity may add a color-coded checkmark to its existing logo (along with other information) to create the logo. Modifying an existing logo may be easier and cheaper, as well as more informative for a user.

In an embodiment, the database where the information behind the logo is stored may be a distributed ledger. The distributed ledger may be a blockchain.

In an embodiment, the logo (or the information included within) may be a non-fungible token ("NFT") that may be secured by a distributed ledger.

Distributed ledger technology may refer to a decentralized, tamperproof, and transactional database. A distributed ledger may provide a distributed, immutable, transparent, secure, and auditable ledger of transactions. The distributed ledger may provide a secure way to store and process transactions among trusted and untrusted nodes on a network.

The distributed ledger may be a public or un-permissioned distributed ledger. A public distributed ledger may not have restrictions on who may participate in establishing a consensus for adding a new record. For example, records stored in a public distributed ledger may only be added to the ledger when systems that rely on the distributed ledger reach a consensus. The distributed ledger may use any suitable consensus algorithm such as Proof of Work, Proof of Stake or Practical Byzantine Fault Tolerance.

The distributed ledger may be a private or permissioned distributed ledger. A private distributed ledger may include restrictions on who may participate in establishing a consensus for adding a new record.

The distributed ledger may utilize a combination of private and public participation to establish a consensus. For example, the distributed ledger may require a threshold number of private and/or public agreements before recording a transaction on the distributed ledger. Utilization of private entities may allow for achieving a consensus (or rejection) of a transaction faster than wholly public distributed ledgers.

The distributed ledger may include a protocol that allows transactions to be verified by unreliable nodes. The distributed ledger can be consulted openly and fully, allowing access to all transactions that have occurred since the first transaction of the system, and can be verified and collated by any entity at any time. The distributed ledger also stores transactional information in a fashion that prevents alteration of the records stored in the distributed ledger. Therefore, if the ledger states that a particular token belongs to a particular wallet, and the movement of the token can be traced from the moment it first appeared in the ledger, that data may be trusted and may be used for various purposes.

The distributed ledger may store information in linked segments, or a chain of "blocks." The linked blocks may collectively form a "blockchain." Each block may store a set of transactions performed at a given time. Blocks are linked or chained to each other by a reference to the previous block. Each block in the distributed ledger is linked to the previously approved block using a cryptographic hash code of the previous block.

Distributed ledger security may be accomplished by imposing strict rules and mutual agreement among nodes when attempting to add a new block of transactions to the distributed ledger. The strict rules and mutual agreement protocols may be referred to as a consensus mechanism. The consensus mechanism synchronizes the decentralized ledger across all nodes that write to the distributed ledger. The consensus mechanism ensures that all nodes agree on a single authoritative copy of the distributed ledger. Nodes that write to the distributed ledger network may be programmed to recognize the longest chain in a network of nodes as the authoritative source of information for the distributed ledger.

A key component of the consensus mechanism may be proof of work. In one embodiment of a distributed ledger, each node must successfully solve a computationally intensive task before adding a new block to the distributed ledger. The proof of work must be complex to solve and at the same time easily verifiable once completed. This dichotomy ensures that only one node is authorized to add a new block and that all other nodes can easily verify that the new block has been properly linked to a prior block. The computationally intensive nature of the block generation process provides tamperproof and auditable transactional database. Alternatively, a more recent paradigm is proof of stake in lieu of proof of work. Proof of stake may be less energy intensive and faster computationally. Other, known and unknown, methods of ensuring a distributed ledger's validity may be used as well as proof of work or proof of stake.

It may be computationally expensive for a malicious attacker to modify a block and attempt to corrupt its contents. The rest of the trusted nodes on the network would continuously generate new blocks, outrunning the attacker in the block generation process. Therefore, a trusted branch of blocks will grow faster than any blocks that can be generated by the attacker. Nodes on a network are programmed to recognize the longest chain in the network as the authoritative source of information. The nodes on the network will therefore invalidate any shorter chains generated by the attacker.

In order for a manipulated block to be successfully added to the distributed ledger, it would be necessary for the malicious attacker to solve the proof of work faster than the rest of nodes on the network. This is structured to be computationally too expensive for the attacker. Accomplishing this feat requires having control of at least 51% of the computing resources in the network.

A transaction or block may be referred to as a token. A token may also be a representation of data included within a transaction or block. Generally, a token is a unit of data stored on distributed ledger. The token may include unique data. The data may be hashed, creating a unique hash. A token may also represent data or information outside of a transaction or block, as in, for example, cryptocurrencies such as Ethereum or Bitcoin. Tokens may be fungible. Tokens may be non-fungible. Fungible tokens, such as cryptocurrencies, are interchangeable. Non-fungible tokens ("NFTs") may be unique and singular (or in limited quantities) and are non-interchangeable. Distributed ledger technology may be used to provide and verify public proof of ownership of tokens. While all units (copies, or tokens) of a particular cryptocurrency may be mutually interchangeable (and thus fungible), non-fungible tokens are not mutually interchangeable. Currently, distributed ledgers may be used to verify ownership of tokens.

NFTs may commonly be used to tokenize specific digital data, such as artwork, or legacy code, or some other digital data. However, nothing limits NFTs to tokenizing artwork or other typical data.

Distributed ledgers may use security methods such as public-key cryptography. A public key may be a long, random-looking string of numbers or other intensive data. The public key may function as a computerized address on the ledger, belonging to a particular user. The address may include a computerized wallet that may contain data or information belonging to the user, along with assets belonging to the user. Units of data, such as tokens, sent across the ledger may be recorded as belonging to that address. Along with the public key, a user may have a private key, which may be linked to the public key. A private key may function as a password that gives the user access to her address and wallet and allow the user to interact with the distributed ledger.

Distributed ledgers may be centralized or decentralized. In a centralized ledger, a server, or group of servers, may maintain the authoritative copy of the ledger, and any node interacting with the ledger (to view or update) may have to be approved by the server or servers. However, in in a decentralized system, every node may have a copy of the ledger and no centralized or official copy of the ledger may exist.

Distributed ledgers/blockchains may be public or private (i.e., conclave or permissioned). Private ledgers may use an access control layer to determine who has access to the ledger to view or add to the ledger.

Distributed ledger smart contracts are code or programs on the ledger that may be partially or fully started, executed, or enforced without human interaction. As long as the parties to a smart contract understand what the smart contract will and will not do, actions taken by the smart contract may be binding on the parties.

In an embodiment, the logo may appear on a splash screen belonging to the software application, video, website, podcast, or other digital software-based item. In other embodiments, the logo may appear on other screens or views of a software application, video, website, podcast, or other digital software-based item. Appearing on a splash screen may be more informative to a user in certain scenarios, but the location of the logo may be unique to every software application, video, website, podcast, or other digital software-based item, based on that software item's unique purposes and needs. For example, a financial literacy application that connects to a bank account may display a logo next to a display of the bank account, to inform a user that the financial institution finds the application trustworthy.

In an embodiment, the logo may include an audiovisual indicator of trustworthiness. The audiovisual indicator may also indicate when the logo has expired or is about to expire. For example, the logo may be programmed to play one or more sounds from a variety of sounds, including speech, at various times. This may allow for the logo to be used by more people, including visually impaired persons.

In an embodiment, the logo may include a tactile indicator of trustworthiness. The tactile indicator may be a vibration. The tactile indicator may also indicate when the logo has expired or is about to expire. Various tactile indicators may be used depending on the capabilities of a device displaying the logo. This may allow for the logo to be used by more people, including visually impaired or hearing-impaired persons.

In an embodiment, the logo may automatically change at one or more pre-determined time intervals. For example, if the logo is valid for one year, from months one through nine, the logo may include a green checkmark. From months nine through twelve the checkmark may change to yellow or orange. And from month twelve onwards (until a new logo is provided), the checkmark may change to red or change from a checkmark to an X. In another example, after the logo expires, the logo may become transparent so that it is no longer visible to a user. Automatically modifying the logo at certain intervals may increase the security of the logo, increase the information provided by the logo, and decrease the possibilities of a malicious actor misusing the logo.

A method for providing an indicator of trustworthiness of an application id provided. The method may include the following steps: A program on a central (or distributed) server may receive one or more quanta of information about a software application from a developer of the software application. In an embodiment, the information may be retrieved from a public source, such as a website.

The program may then determine that the software application is trustworthy. The program may analyze the security protocols, encryption, and safety of the application, and may also analyze any sociopolitical, moral, and ethical positions of the developer.

At a subsequent step, when the application is trustworthy, the program may create an encrypted logo that may indicate to a viewer that the software application is trustworthy. The program may then transmit the logo to the developer. The program may also log the transmission, as well as other information in a database.

When the software application is available through a third-party application store, the program may transmit the logo to the application store. The logo may be displayed within a page of the application store where the software application is located, so that it may be visible to a user or customer when visiting the application store to download or update the application.

In this method, the logo may include one or more of the following: a visual indicator of trustworthiness, a name of an authorized recipient of the logo, such as the developer, a name of the software application that is associated with the bespoke logo, an identity of an entity creating the one or more logos, an expiration date, metadata, other information, and a combination of one or more of the above.

Other information may include, inter alia, a name of an authorized recipient, such as the developer, author, or creator; name of the software application, video, website, podcast, or other digital software-based item; an identity of an entity creating the logo; other information. The name(s) may be the name of a person or entity.

In various embodiments of the method, the information may be machine readable and/or visible to a human eye. The information may appear in metadata. The information may be embedded in the logo. The information may be embedded in a manifest attached to a picture (e.g., a .jpeg file) of the logo.

In an embodiment, the method may include the logo including a visual indicator of trustworthiness, such as checkmark, X, thumbs up, thumbs down, a color shade, different levels of transparency, or other visual indicator. In an embodiment, the checkmark may be color-coded.

In an embodiment, the method may include issuing a particular software application, video, website, podcast, or other digital software-based item multiple logos, each from a different entity.

In an embodiment, the method may include a central authority creating a logo for multiple entities to apply a single logo to a software application, video, website, podcast, or other digital software-based item.

In an embodiment of the method, the logo may include an expiration date. The date may indicate when the program determines the software application, video, website, podcast, or other digital software-based item is no longer trustworthy. The expiration date, while it is in a decipherable format, may indicate to a user that the logo is relevant, old, stale, expired, due to expire, or new. In an embodiment, the logo may never expire. In an embodiment, the expiration date may be modified or modifiable.

In an embodiment, the method may include the logo including metadata. The metadata may include the same or different information as described above. The metadata may be machine readable. The metadata may be visible to the human eye. The metadata may be embedded within the visual confines of the logo. The metadata may be embedded within a hidden file outside the visual confines of the logo.

In an embodiment, the method may include the logo including an indicator of a level of trustworthiness in the software application, video, website, podcast, or other digital software-based item. The indicator may be visual, auditory, sensory, or a combination of the above.

In an embodiment, when the software application, video, website, podcast, or other digital software-based item is available from a third-party application store, the method may include transmitting the logo to the application store separate from or in addition to the developer.

In an embodiment, the method may require both the third-party application store and the software application, video, website, podcast, or other digital software-based item to display the logo.

In an embodiment, when the logo is transmitted to the third-party application store, the method may include the owner (or developer) of the store displaying the logo. The logo may be displayed within a page where a customer or user may download the application.

In an embodiment, the method may include embedding a countdown timer within the logo and/or the expiration date. The method may include displaying the countdown timer or time to a user.

The countdown timer or time may be used by the method to determine which frame (of a multi-frame logo) to display at a particular time.

In an embodiment, when the countdown timer reaches zero, the method may include displaying the logo on a splash screen belonging to the software application together with a notification that the logo has expired. In another embodiment, the method may include turning the logo transparent when the countdown timer reaches zero, so that the logo may no longer be visible to a user.

In an embodiment, the method may include communicating with an outside source to determine an accurate date or time. For example, the method may include communicating with a trusted website to determine the date or time. The communication may be over any suitable communication network available to the logo. The outside date or time may be compared with the timer's internal date or time and any discrepancies may be corrected.

In an embodiment, the method may include checking with an external source for the date and time at a predetermined interval (e.g., every day, every week, once a month, etc.). In an embodiment, the method may include checking with an external source when it is determined, through an internal timer, that a deadline is approaching. For example, if the logo is valid for twelve months and is set to change appearance at the 9-month mark, the timer may confirm its accuracy as the 9-month deadline is approaching.

In an embodiment, the method may include embedding a selectable hyperlink or button within the logo that may point a user to a website or webpage (or other location) that includes the information included with the logo.

In an embodiment, the method may include encrypting the logo. In an embodiment, the method may include encrypting the information included within the logo. Any suitable encryption method or algorithm may be used.

In an embodiment, the method may utilize one or more artificial intelligence/machine learning ("AI/ML") algorithms to determine that the software application is trustworthy, and/or create the logo.

In an embodiment, the method may modify an already existing logo belonging to the entity when creating the logo. For example, the method may add a color-coded checkmark to an entity's existing logo (along with other information) to create the logo.

In an embodiment, the method may include storing the information behind the logo in a distributed ledger. The distributed ledger may be a blockchain.

In an embodiment, the method may include creating the logo (or the information included within) as a non-fungible token ("NFT") that may be secured by a distributed ledger.

In an embodiment, the method may include the logo appearing on a splash screen belonging to the software application, video, website, podcast, or other digital software-based item.

In other embodiments, the method may include the logo appearing on other screens or views of a software application, video, website, podcast, or other digital software-based item. Appearing on a splash screen may be more informative to a user in certain scenarios, but the location of the logo may be unique to every software application, video, website, podcast, or other digital software-based item, based on that software item's unique purposes and needs. For example, a financial literacy application that connects to a bank account may display a logo next to a display of the bank account, to inform a user that the financial institution finds the application trustworthy.

In an embodiment, the method may include the logo including an audiovisual indicator of trustworthiness. The audiovisual indicator may also indicate when the logo has expired or is about to expire. For example, the logo may be programmed to play one or more sounds from a variety of sounds, including speech, at various times. This may allow for the logo to be used by more people, including visually impaired persons.

In an embodiment, the method may include the logo including a tactile indicator of trustworthiness. The tactile indicator may be a vibration. The tactile indicator may also indicate when the logo has expired or is about to expire. Various tactile indicators may be used depending on the capabilities of a device displaying the logo. This may allow for the logo to be used by more people, including visually impaired or hearing-impaired persons.

In an embodiment, the method may include the logo automatically changing at one or more pre-determined time intervals. For example, if the logo is valid for one year, from months one through nine, the logo may include a green checkmark. From months nine through twelve the checkmark may change to yellow or orange. And from month twelve onwards (until a new logo is provided), the checkmark may change to red or change from a checkmark to an X. In another example, after the logo expires, the logo may become transparent so that it is no longer visible to a user. Automatically modifying the logo at certain intervals may increase the security of the logo, increase the information provided by the logo, and decrease the possibilities of a malicious actor misusing the logo.

The various embodiments described above, as well as other embodiments, may be applicable to the method described above.

An apparatus for providing an indicator of trustworthiness of an application is provided. The apparatus may include a computer. The computer may be a server, desktop computer, mobile computer, tablet, or other type of computer.

The computer may include, inter alia, a communication link, a processor or multiple processors, and a non-transitory memory configured to store executable data. The executable data may be configured to run on the processor. The executable data may include an operating system and a trust indicator program.

The trust indicator program may receive or discover one or more quanta of information about a software application from a developer of the software application. The program may then determine whether the software application is trustworthy or not.

When the program determines that the program is trustworthy, the program may create a bespoke logo that indicates to a viewer that the software application is trustworthy, transmit the logo to the developer or elsewhere, and log the transmission (and other information) in a database.

The logo may include one or more of the following: a visual indicator of trustworthiness, a name of an authorized recipient of the logo, such as the developer, a name of the software application that is associated with the bespoke logo, an identity of an entity creating the one or more logos, an expiration date, metadata, other information, and a combination of one or more of the above.

The various embodiments described above, as well as other embodiments, may be applicable to the apparatus described above.

A processor(s) may control the operation of the apparatus and its components, which may include RAM, ROM, an input/output module, and other memory. The microprocessor may also execute all software running on the apparatus. Other components commonly used for computers, such as EEPROM or Flash memory or any other suitable components, may also be part of the apparatus.

A communication link may enable communication with a recipient computer as well as any server or servers. The communication link may include any necessary hardware (e.g., antennae) and software to control the link. Any appropriate communication link may be used. In an embodiment, the network used may be the Internet. In another embodiment, the network may be an internal intranet.

One of ordinary skill in the art will appreciate that the steps shown and described herein may be performed in other than the recited order and that one or more steps illustrated may be optional. Apparatus and methods may involve the use of any suitable combination of elements, components, method steps, computer-executable instructions, or computer-readable data structures disclosed herein.

Illustrative embodiments of apparatus and methods in accordance with the principles of the invention will now be described with reference to the accompanying drawings, which form a part hereof. It is to be understood that other embodiments may be utilized, and that structural, functional, and procedural modifications may be made without departing from the scope and spirit of the present invention.

As will be appreciated by one of skill in the art, the invention described herein may be embodied in whole or in part as a method, a data processing system, or a computer program product. Accordingly, the invention may take the form of an entirely hardware embodiment, or an embodiment combining software, hardware and any other suitable approach or apparatus.

Furthermore, such aspects may take the form of a computer program product stored by one or more computer-readable storage media having computer-readable program code, or instructions, embodied in or on the storage media. Any suitable computer readable storage media may be utilized, including hard disks, CD-ROMs, optical storage devices, magnetic storage devices, and/or any combination thereof. In addition, various signals representing data or events as described herein may be transferred between a source and a destination in the form of electromagnetic waves traveling through signal-conducting media such as metal wires, optical fibers, and/or wireless transmission media (e.g., air and/or space).

In accordance with principles of the disclosure, FIG. 1 shows an illustrative block diagram of apparatus 100 that includes a computer 101. Computer 101 may alternatively be referred to herein as a "computing device." Elements of apparatus 100, including computer 101, may be used to implement various aspects of the apparatus and methods disclosed herein. A "user" of apparatus 100 or computer 101 may include other computer systems or servers or a human, such as the program described herein.

Computer 101 may have one or more processors/microprocessors 103 for controlling the operation of the device and its associated components, and may include RAM 105, ROM 107, input/output module 109, and a memory 115. The microprocessors 103 may also execute all software running on the computer 101—e.g., the operating system 117 and applications 119 such as a logo trust program and security protocols. Other components commonly used for computers, such as EEPROM or Flash memory or any other suitable components, may also be part of the computer 101.

The memory 115 may be comprised of any suitable permanent storage technology—e.g., a hard drive or other non-transitory memory. The ROM 107 and RAM 105 may be included as all or part of memory 115. The memory 115 may store software including the operating system 117 and application(s) 119 (such as a logo trust program and security protocols) along with any other data 111 (information about each logo created) needed for the operation of the apparatus 100. Memory 115 may also store applications and data. Alternatively, some or all of computer executable instructions (alternatively referred to as "code") may be embodied in hardware or firmware (not shown). The microprocessor 103 may execute the instructions embodied by the software and code to perform various functions.

The network connections/communication link may include a local area network (LAN) and a wide area network (WAN or the Internet) and may also include other types of networks. When used in a WAN networking environment, the apparatus may include a modem or other means for establishing communications over the WAN or LAN. The modem and/or a LAN interface may connect to a network via an antenna. The antenna may be configured to operate over Bluetooth, wi-fi, cellular networks, or other suitable frequencies.

Any memory may be comprised of any suitable permanent storage technology—e.g., a hard drive or other non-transitory memory. The memory may store software including an operating system and any application(s) (such as a logo trust program and security protocols) along with any data needed for the operation of the apparatus and to allow authentication of a user. The data may also be stored in cache memory, or any other suitable memory.

An input/output ("I/O") module 109 may include connectivity to a button and a display. The input/output module may also include one or more speakers for providing audio output and a video display device, such as an LED screen and/or touchscreen, for providing textual, audio, audiovisual, and/or graphical output.

In an embodiment of the computer 101, the microprocessor 103 may execute the instructions in all or some of the operating system 117, any applications 119 in the memory 115, any other code necessary to perform the functions in this disclosure, and any other code embodied in hardware or firmware (not shown).

In an embodiment, apparatus 100 may consist of multiple computers 101, along with other devices. A computer 101 may be a mobile computing device such as a smartphone or tablet.

Apparatus 100 may be connected to other systems, computers, servers, devices, and/or the Internet 131 via a local area network (LAN) interface 113.

Apparatus 100 may operate in a networked environment supporting connections to one or more remote computers and servers, such as terminals 141 and 151, including, in general, the Internet and "cloud". References to the "cloud" in this disclosure generally refer to the Internet, which is a world-wide network. "Cloud-based applications" generally refer to applications located on a server remote from a user, wherein some or all of the application data, logic, and instructions are located on the internet and are not located on a user's local device. Cloud-based applications may be accessed via any type of internet connection (e.g., cellular or wi-fi).

Terminals 141 and 151 may be personal computers, smart mobile devices, smartphones, or servers that include many or all of the elements described above relative to apparatus 100. The network connections depicted in FIG. 1 include a local area network (LAN) 125 and a wide area network (WAN) 129 but may also include other networks. Computer 101 may include a network interface controller (not shown), which may include a modem 127 and LAN interface or adapter 113, as well as other components and adapters (not shown). When used in a LAN networking environment, computer 101 is connected to LAN 125 through a LAN interface or adapter 113. When used in a WAN networking environment, computer 101 may include a modem 127 or other means for establishing communications over WAN 129, such as Internet 131. The modem 127 and/or LAN interface 113 may connect to a network via an antenna (not shown). The antenna may be configured to operate over Bluetooth, wi-fi, cellular networks, or other suitable frequencies.

It will be appreciated that the network connections shown are illustrative and other means of establishing a communications link between computers may be used. The existence of various well-known protocols such as TCP/IP, Ethernet, FTP, HTTP, and the like is presumed, and the system can be operated in a client-server configuration. The computer may transmit data to any other suitable computer system. The computer may also send computer-readable instructions, together with the data, to any suitable computer system. The computer-readable instructions may be to store the data in cache memory, the hard drive, secondary memory, or any other suitable memory.

Application program(s) 119 (which may be alternatively referred to herein as "plugins," "applications," or "apps") may include computer executable instructions for a logo trust program and security protocols, as wells as other programs. In an embodiment, one or more programs, or aspects of a program, may use AI/ML algorithm(s). The various tasks may be related determining the trustworthiness of an application, website, video, podcast etc. and creating a bespoke logo to indicate a level of trustworthiness.

Computer 101 may also include various other components, such as a battery (not shown), speaker (not shown), a network interface controller (not shown), and/or antennas (not shown).

Terminal 151 and/or terminal 141 may be portable devices such as a laptop, cell phone, tablet, smartphone, server, or any other suitable device for receiving, storing, transmitting and/or displaying relevant information. Terminal 151 and/or terminal 141 may be other devices such as remote computers or servers. The terminals 151 and/or 141 may be computers where a user is interacting with an application and viewing a logo.

Any information described above in connection with data 111, and any other suitable information, may be stored in memory 115. One or more of applications 119 may include one or more algorithms that may be used to implement features of the disclosure, and/or any other suitable tasks.

In various embodiments, the invention may be operational with numerous other general purpose or special purpose computing system environments or configurations. Examples of well-known computing systems, environments, and/or configurations that may be suitable for use with the invention in certain embodiments include, but are not limited to, personal computers, servers, hand-held or laptop devices, tablets, mobile phones, smart phones, other Computers, and/or other personal digital assistants ("PDAs"), multiprocessor systems, microprocessor-based systems, set top boxes, programmable consumer electronics, network PCs, minicomputers, mainframe computers, distributed computing environments that include any of the above systems or devices, and the like.

Aspects of the invention may be described in the general context of computer-executable instructions, such as program modules, being executed by a computer. Generally, program modules include routines, programs, objects, components, data structures, etc., that perform particular tasks or implement particular abstract data types. The invention may also be practiced in distributed computing environments where tasks are performed by remote processing devices that are linked through a communications network, e.g., cloud-based applications. In a distributed computing environment, program modules may be located in both local and remote computer storage media including memory storage devices.

Figure 2:
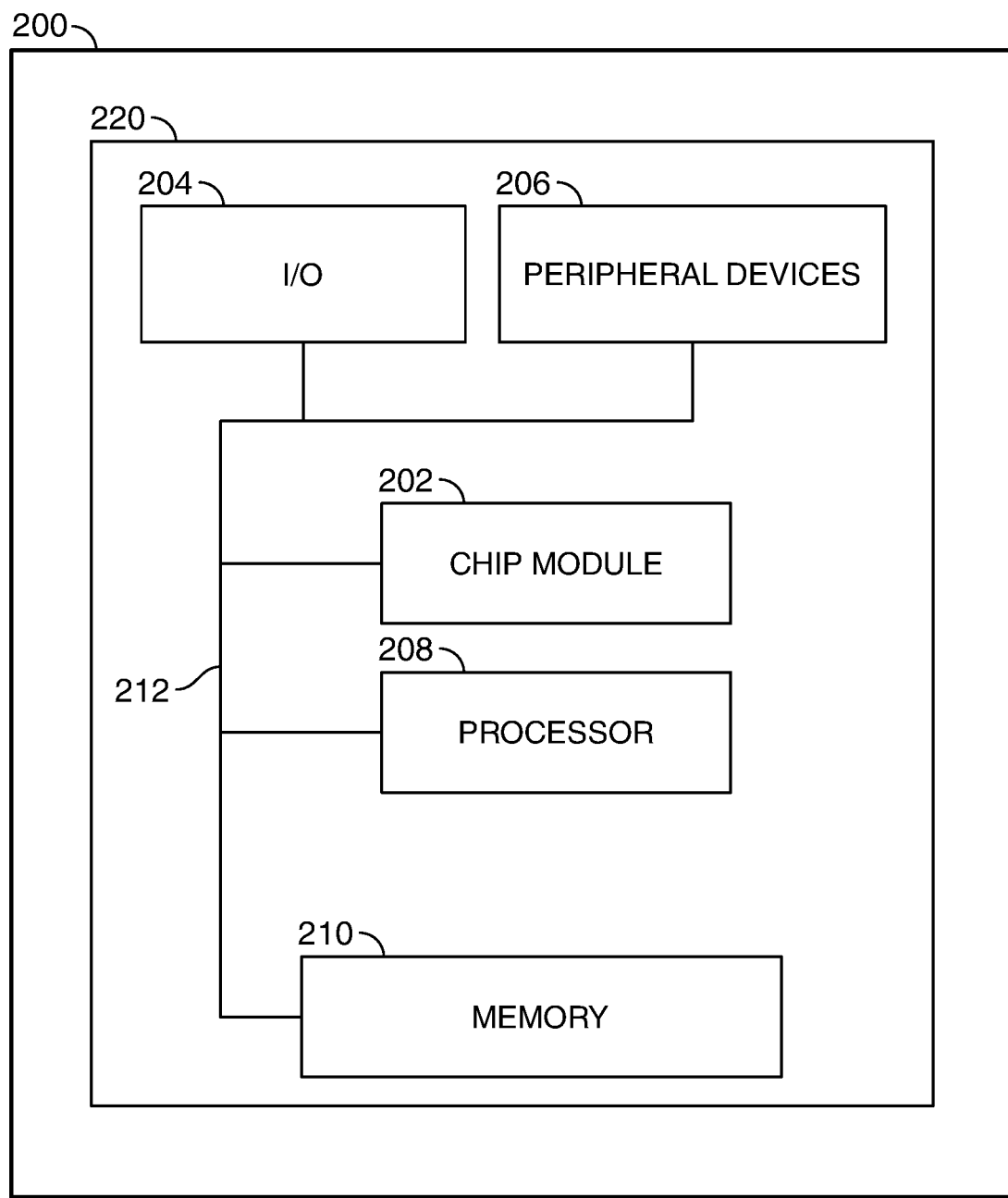
FIG. 2 shows an illustrative apparatus in accordance with principles of the disclosure.
Figure 3:
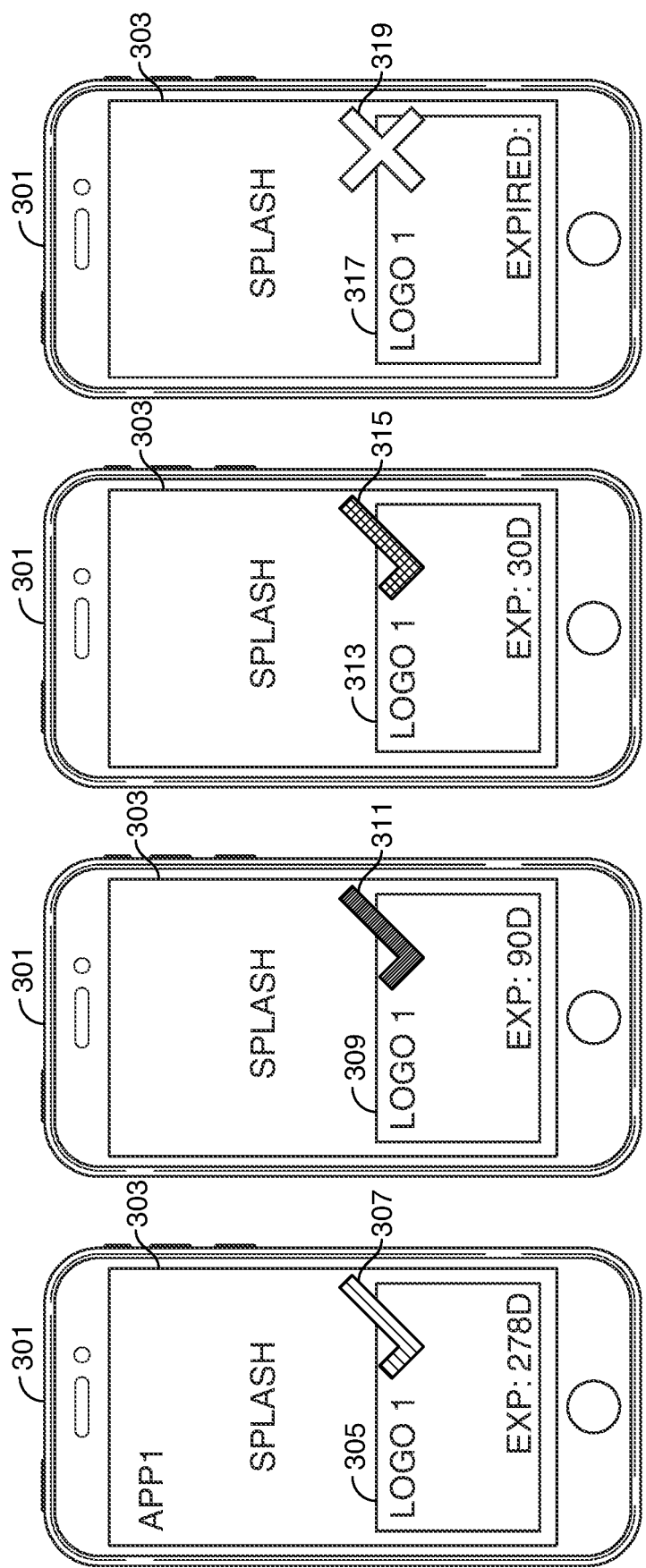
FIG. 3a shows an illustrative apparatus in accordance with principles of the disclosure.
FIG. 3b shows an illustrative apparatus in accordance with principles of the disclosure.
FIG. 3c shows an illustrative apparatus in accordance with principles of the disclosure.
FIG. 3d shows an illustrative apparatus in accordance with principles of the disclosure.

FIG. 2 shows illustrative apparatus 200 that may be configured in accordance with the principles of the disclosure. Apparatus 200 may be a server or computer with various peripheral devices 206. Apparatus 200 may include one or more features of the apparatus shown in FIGS. 1, 3, and 6. Apparatus 200 may include chip module 202, which may include one or more integrated circuits, and which may include logic configured to perform any other suitable logical operations.

Apparatus 200 may include one or more of the following components: I/O circuitry 204, which may include a transmitter device and a receiver device and may interface with fiber optic cable, coaxial cable, telephone lines, wireless devices, PHY layer hardware, a keypad/display control device, an display (LCD, LED, OLED, etc.), a touchscreen or any other suitable media or devices; peripheral devices 206, which may include other computers; logical processing device 208, which may compute data information and structural parameters of various applications; and machine-readable memory 210.

Machine-readable memory 210 may be configured to store in machine-readable data structures: machine executable instructions (which may be alternatively referred to herein as "computer instructions" or "computer code"), applications, signals, recorded data, and/or any other suitable information or data structures. The instructions and data may be encrypted.

Components 202, 204, 206, 208 and 210 may be coupled together by a system bus or other interconnections 212 and may be present on one or more circuit boards such as 220. In some embodiments, the components may be integrated into a single chip. The chip may be silicon-based.

FIG. 3*a* shows an illustrative apparatus in accordance with principles of the disclosure. A mobile device 301 may display a splash screen 303 of an application. The splash screen 303 may include a logo 305. The logo may include a check mark 307. As logo 305 expires in 278 days, the check mark 307 may appear green to a user (not shown).

FIG. 3*b* shows an illustrative apparatus in accordance with principles of the disclosure. A mobile device 301 may display a splash screen 303 of an application. The splash screen 303 may include a logo 309. The logo may include a check mark 311. As logo 305 expires in 90 days, the check mark 311 may appear yellow or orange to a user (not shown).

FIG. 3*c* shows an illustrative apparatus in accordance with principles of the disclosure. A mobile device 301 may display a splash screen 303 of an application. The splash screen 303 may include a logo 313. The logo may include a check mark 315. As logo 313 expires in 30 days, the check mark 315 may appear orange or red to a user (not shown).

FIG. 3*d* shows an illustrative apparatus in accordance with principles of the disclosure. A mobile device 301 may display a splash screen 303 of an application. The splash screen 303 may include a logo 317. The logo may include an "X" mark 319. As logo 317 has expired, the "X" mark 319 may appear red to a user (not shown).

In another embodiment, logo 317 may be transparent and invisible to a user (not shown), or faded out, instead of displaying an "X" mark.

Figure 4:
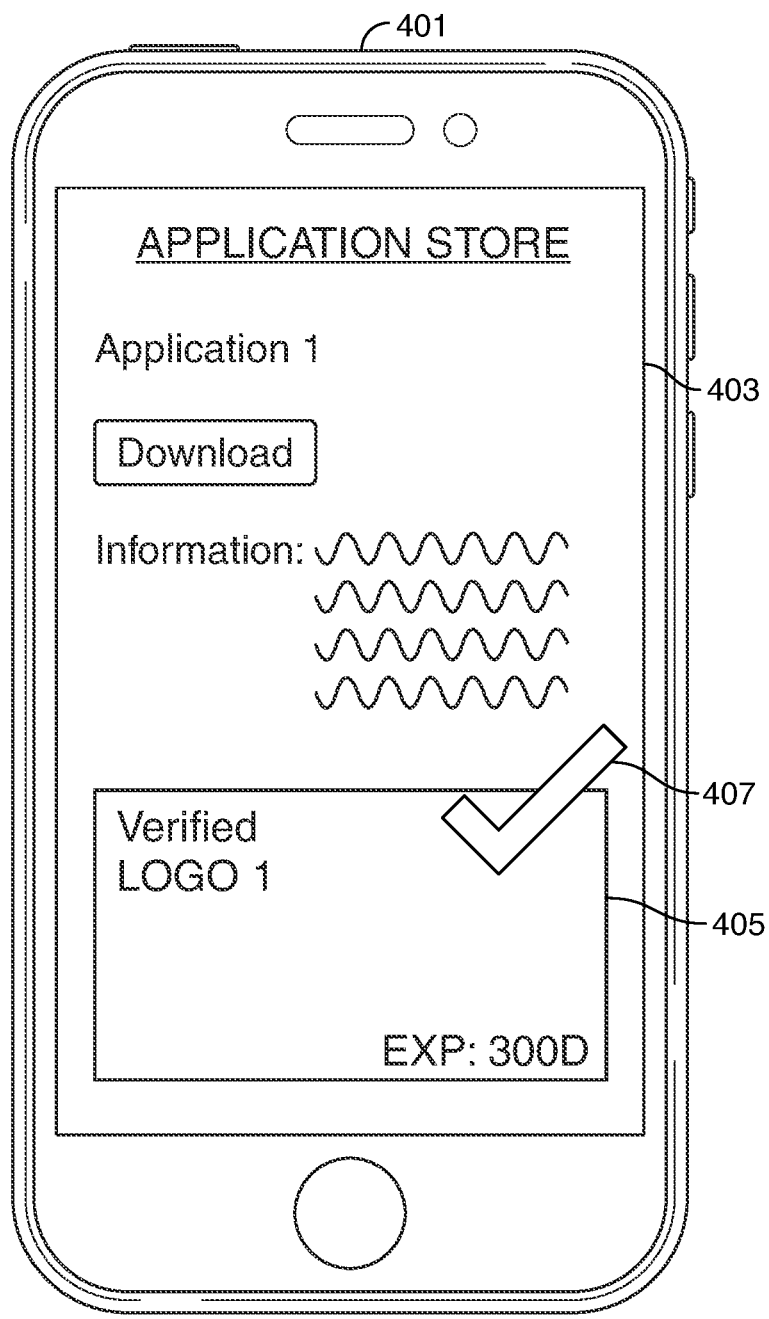
FIG. 4 shows an illustrative apparatus in accordance with principles of the disclosure.

FIG. 4 shows an illustrative apparatus in accordance with principles of the disclosure. A mobile device 401 may display a third-party application store screen 403. The store screen 403 may display a page to a user (not shown) allowing a user to download an application. The store screen 403 may also include a verified logo 405. The logo 405 may include a check mark 407. As logo 405 expires in 300 days, the check mark 407 may appear green to a user (not shown). In an embodiment, the logo 405 may also appear on the application when downloaded.

Figure 5:
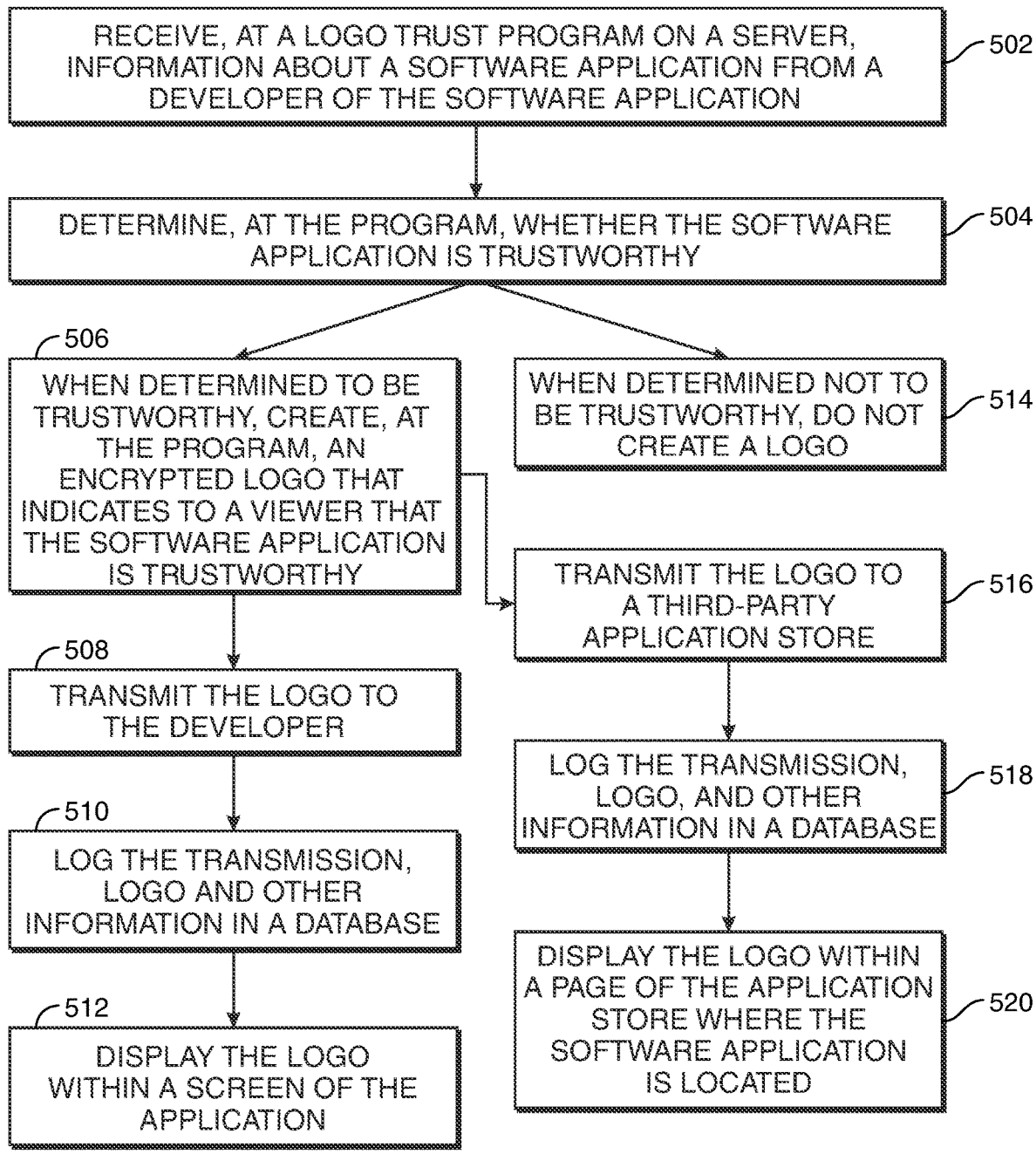
FIG. 5 shows an illustrative flowchart in accordance with principles of the disclosure.

FIG. 5 shows an illustrative flowchart in accordance with principles of the disclosure. Methods may include some or all of the method steps numbered 502 through 520. Methods may include the steps illustrated in FIG. 5 in an order different from the illustrated order. The illustrative method shown in FIG. 5 may include one or more steps performed in other figures or described herein. Steps 502 through 520 may be performed on the apparatus shown in FIGS. 1-4, and 6, or other apparatus.

At step 502, a logo trust program on a server may receive information about a software application from a developer of the software application. The server may be a server, personal computer, mobile device, or other computer. In various embodiments, the information may be gathered by the program by mining the internet, instead of, or in addition to, being received from the developer. In various embodiments, instead of, or in addition to a software application, the disclosure may apply to websites, videos, podcasts, cloud-based applications, and other software.

At step 504, the program may determine whether the software application (or website, video, etc.) is trustworthy or not. The program may analyze the security protocols of the application. The program may analyze the usability of the application. The program may analyze the sociopolitical platform of the developer or application. The program may analyze other aspects of the developer or application. The determination of trustworthiness may be driven by guidelines provided to the program by the entity or entities controlling the program or set by the program. For example, if an entity does not desire to be associated with political position a, the program may determine if the developer or the application holds political position XYZ or not.

At step 506, when the program determines the application is trustworthy, the program may create a unique logo that may indicate to a viewer that the software application is trustworthy. In various embodiments, the logo may include various information either within the logo itself and/or embedded as data within the logo that may be accessed by a user.

The logo may include one or more of the following, along with other information: a visual indicator of trustworthiness, a name of an authorized recipient of the logo, such as the developer, a name of the software application that is associated with the bespoke logo, an identity of an entity creating the one or more logos, an expiration date, metadata, other information, and a combination of one or more of the above At step 508, the program may transmit the logo to the developer so that the developer may incorporate the logo into the software application. At step 510, the program may log the transmission, the creation of the logo, the logo itself, and other information into a database. The database may be used for quality control, for reporting purposes, as well as other purposes.

At step 512, the developer or the program may display the logo within a screen of the application. The screen may be a splash screen or other screen/display.

At step 514, when the program determines that that application is not trustworthy, the program will not create a unique logo. The program may inform the developer, the entity, or others of its determination.

At step 516, when the program determines the application is trustworthy, the program may also transmit the logo to a third-party application store where the application is available to users.

At step 518, the program may log the transmission to the application store, the creation of the logo, the logo itself, and other information into a database.

At step 520, the third-party application store or the program, may display the logo within a screen or page where the application is available for use or download.

Figure 6:
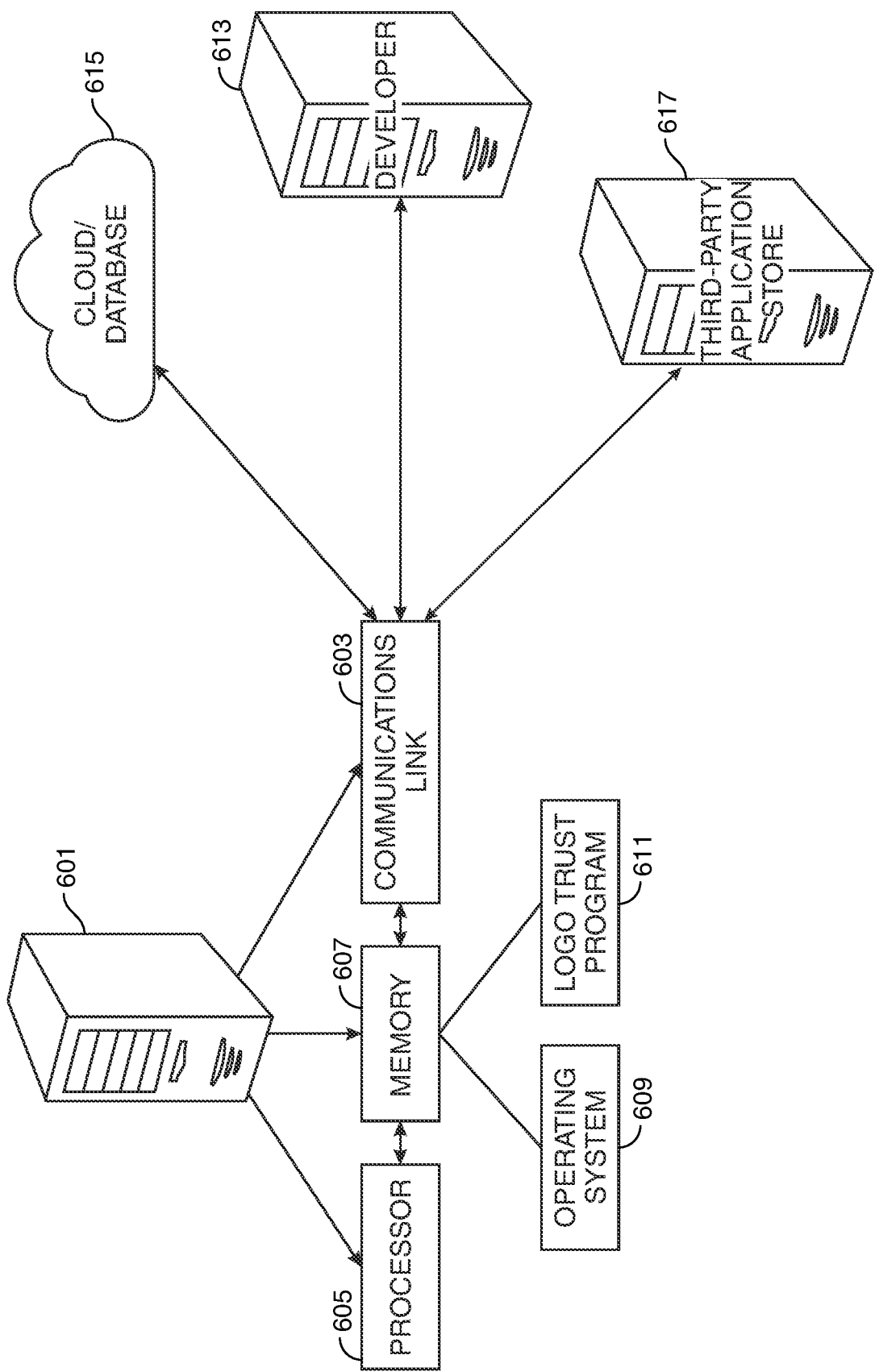
FIG. 6 shows an illustrative apparatus in accordance with principles of the disclosure.

FIG. 6 shows an illustrative apparatus in accordance with principles of the disclosure. A server computer 601 may include a communication link 603, a processor/processors 605, and a non-transitory memory 607, as well as other components.

The non-transitory memory 607 may include an operating system 609, and a logo trust indication program 611, as well as other data and programs.

The communications link 603 may communicate with a developer 613, the internet/cloud 615, and a third-party application store 613, along with other destinations.

The communications link 603 may communicate directly or indirectly with the cloud 615, developer 613 or third-party store 617. An external network may be the Internet. An internal network may be an intranet. An internal network may use Internet protocols.

The trust indicator program 611 may receive or discover one or more quanta of information about a software application from a developer 613 of the software application. The program may then determine whether the software application is trustworthy or not.

When the program determines that the program is trustworthy, the program may create a bespoke logo that indicates to a viewer that the software application is trustworthy, transmit the logo to the developer 613 or elsewhere (such as a third-party application store 617), and log the transmission (and other information) in a database.

The logo may include one or more of the following: a visual indicator of trustworthiness, a name of an authorized recipient of the logo, such as the developer, a name of the software application that is associated with the bespoke logo, an identity of an entity creating the one or more logos, an expiration date, metadata, other information, and a combination of one or more of the above.

Thus, apparatus and methods for determining whether a software application, video, website, podcast, or other digital software-based item is trustworthy and creating and issuing visual and other indicators of trust in software applications, videos, websites, podcasts, or other digital software-based items are provided. Persons skilled in the art will appreciate that the present invention can be practiced by other than the described embodiments, which are presented for purposes of illustration rather than of limitation.

What is claimed is:

1. A method for providing an indicator of trustworthiness of an application, the method comprising the steps of:
receiving, at a program on a central server, one or more quanta of information about a software application from a developer of the software application;
determining, at the program, that the software application is trustworthy;
creating, at the program, an encrypted logo that indicates to a viewer that the software application is trustworthy;
transmitting the logo to the developer;
logging the transmission in a database; and
when the software application is available through a third-party application store:
transmitting the logo to the application store; and
displaying the logo within a page of the application store where the software application is located;
wherein the logo comprises:
one or more of: a visual indicator of trustworthiness; a name of an authorized recipient, wherein the authorized recipient is the developer; a name of the software application; an identity of an entity creating the logo; an expiration date; and metadata; and
a selectable hyperlink that points to a website comprising:
a visual indicator of trustworthiness, a name of an authorized recipient, wherein the authorized recipient is the developer, a name of the software application, an identity of an entity creating the logo, an expiration date, and metadata.

2. An apparatus for providing an indicator of trustworthiness of an application, the apparatus comprising:
a computer, the computer comprising:
a communication link;
a processor; and
a non-transitory memory configured to store executable data configured to run on the processor comprising:
an operating system; and
a trust indicator program;
wherein:
the trust indicator program:
receives one or more quanta of information about a software application from a developer of the software application;
determines that the software application is trustworthy;

creates a logo that indicates to a viewer that the software application is trustworthy;
transmits the logo to the developer; and
logs the transmission in a database; and
the logo comprises:
one or more of: a visual indicator of trustworthiness; a name of an authorized recipient, wherein the authorized recipient is the developer; a name of the software application; an identity of an entity creating the logo; an expiration date; and metadata; and
a selectable hyperlink that points to a website comprising:
a visual indicator of trustworthiness, a name of an authorized recipient, wherein the authorized recipient is the developer, a name of the software application, an identity of an entity creating the logo, an expiration date, and metadata.

3. The apparatus of claim 2 wherein when the software application is available in a third-party application store, the trust indicator program transmits the logo to the application store.

4. The apparatus of claim 3 wherein an owner of the third-party application store displays the logo within a page where the software application is located.

5. The apparatus of claim 2 wherein the expiration date comprises a countdown timer.

6. The apparatus of claim 2 wherein the visual indicator is a check mark.

7. The apparatus of claim 6 wherein the check mark is color-coded.

8. The apparatus of claim 2 wherein the logo is encrypted.

9. The apparatus of claim 2 wherein the trust indicator program determines the software application is trustworthy through one or more artificial intelligence/machine learning ("AI/ML") algorithms.

10. The apparatus of claim 2 wherein the entity modifies an existing logo belonging to the entity to create the logo.

11. The apparatus of claim 2 wherein the database is a distributed ledger.

12. The apparatus of claim 11 wherein the distributed ledger is a blockchain.

13. The apparatus of claim 12 wherein the logo is a non-fungible token ("NFT").

14. The apparatus of claim 5 wherein when the countdown timer reaches zero, the logo is displayed on a splash screen belonging to the software application together with a notification that the logo has expired.

15. The apparatus of claim 2 wherein the logo is displayed on a splash screen belonging to the software application.

16. The apparatus of claim 2 wherein the logo further comprises an audiovisual indicator of trustworthiness.

17. The apparatus of claim 2 wherein the logo further comprises a tactile indicator of trustworthiness.

18. The apparatus of claim 2 wherein the logo automatically changes at one or more pre-determined time intervals.

* * * * *